Dec. 22, 1931.                L. W. OBERLY                1,837,668
                              HOG FEEDER
                          Filed Nov. 1, 1929

L. W. Oberly
    Inventor
By C. A. Snow & Co.
    Attorneys.

Patented Dec. 22, 1931

1,837,668

UNITED STATES PATENT OFFICE

LAWRENCE W. OBERLY, OF HUMBOLDT, NEBRASKA

HOG FEEDER

Application filed November 1, 1929. Serial No. 404,146.

This invention relates to hog feeders, and aims to provide a novel form of feeder wherein the hogs feeding from the device may operate means for agitating the material contained in the feeder, to cause the material to fall into the feeding compartment.

Another object of the invention is to provide means for dividing the feeding compartment into a plurality of independent compartments so that the hogs will not interfere with each other while feeding, and at the same time provide a guard to prevent the hogs from lying in the feeding compartment.

Another important object of the invention is to provide an adjustable agitating member, the lower edge thereof being arranged in spaced relation with the bottom of the feeding compartment, means being provided for securing the agitating member to permit greater or less quantities of feed to be delivered into the feeding compartment.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
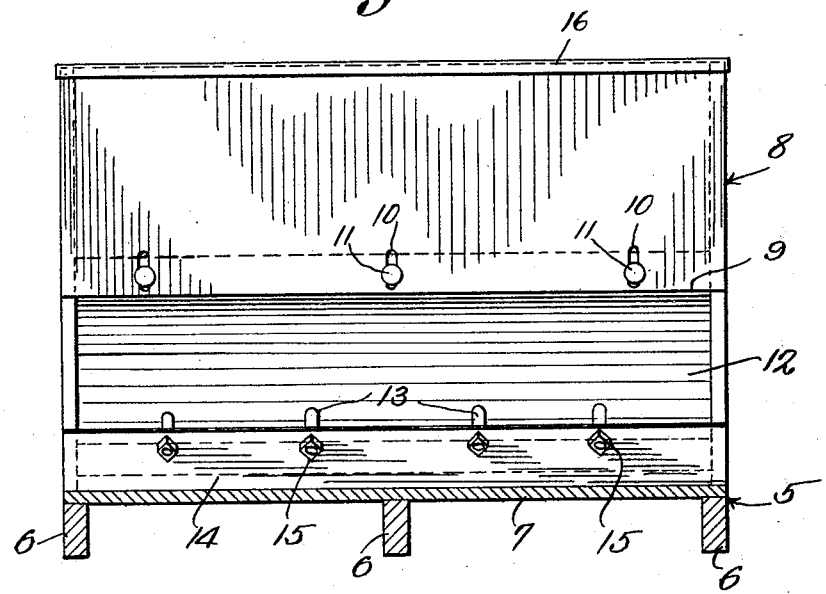
Figure 1 is a front elevational view of a feeder constructed in accordance with the invention.

Referring to the drawings in detail, the feeder embodies a platform indicated generally by the reference character 5, the same comprising supporting beams 6, connected by boards 7.

The feeder proper is box-like in formation and is indicated generally by the reference character 8, the same being provided with an opening 9 in the front wall thereof, the opening extending throughout the entire length of the feeder, as shown by Figure 1.

Formed in the front wall of the feeder, are elongated openings 10 that accommodate the bolts 11 which in turn secure the curved agitating plate 12, to the feeder, the elongated openings 10 permitting of adjustment of the plate 12 to the end that the lower edge of the plate 12 may be disposed at various points in spaced relation with the bottom of the feeder, to regulate the quantity of material passing into the feeding compartment from the body portion of the feeder. The plate 12 is formed of flexible sheet metal, so that the hogs while feeding, may press against the plate 12, causing it to flex and agitate the material in the feeder.

Figure 2:
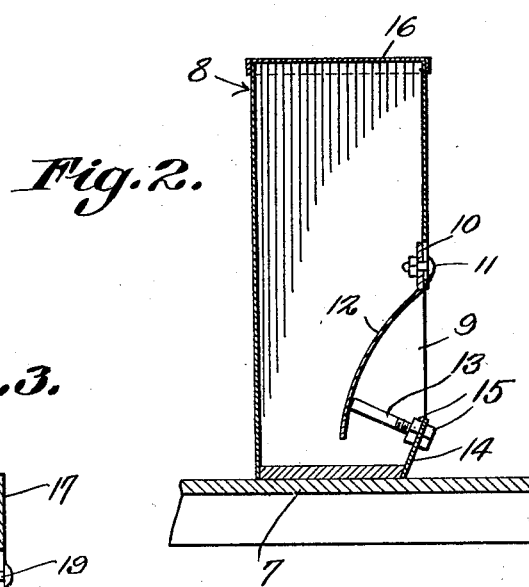
Figure 2 is a vertical sectional view through the feeder.

The reference character 13 designates rods which are secured to the lower front wall section 14, as by means of the nuts 15 arranged on opposite sides of the wall section 14. These rods 13 divide the feeding compartment into a plurality of individual compartments to prevent the hogs from interfering with each other when feeding. These rods 13 also act as stops for the plate 12, which under normal conditions engages the inner ends of the rods, as shown by Figure 2 of the drawings.

A cover 16 is provided for the body portion and protects the material in the body portion against the elements and provides a closure which may be readily and easily removed to permit of the filling of the body portion with the feed.

Figure 3:
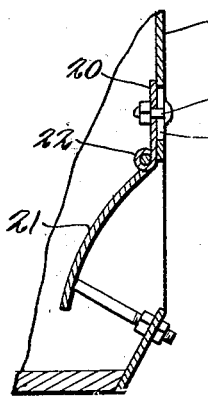
Figure 3 is a fragmental sectional view illustrating a modified form of the invention.

In the modified form of the invention as illustrated by Figure 3, the reference character 17 designates the front wall of the body portion, which is also provided with elongated openings 18 to accommodate the bolts 19 that pass through openings in the section 20, to adjustably support the section 20.

The reference character 21 designates a curved agitating member which is connected to the section 20, by means of the hinges 22, so that heavier metal may be used in the construction of the member 21.

I claim:

1. A hog feeder comprising a body portion, a flexible partitioning member dividing the body portion into a feed compartment and a feeding compartment, said partitioning member adapted to flex when engaged by the hogs while feeding, and rods extending inwardly from the front wall of the body portion and engaging the partitioning member to restrict movement of the partitioning member.

2. A hog feeder comprising a body portion, a flexible partitioning member dividing the body portion into a feed compartment and a feeding compartment, means for mounting the flexible partitioning member to permit of vertical adjustment of the partitioning member, rods extending inwardly from the front wall of the body portion and providing stops against which the flexible partitioning member rests, and said flexible partitioning member adapted to flex to agitate material within the feed compartment to cause the material to move into the feeding compartment.

In testimony that I claim the foregoing as my own, I have hereto affixed my signature.

LAWRENCE W. OBERLY.